(12) United States Patent
Baldwin

(10) Patent No.: US 7,175,563 B2
(45) Date of Patent: Feb. 13, 2007

(54) PLANETARY GEARING FOR A DUAL CLUTCH TRANSMISSION

(75) Inventor: Reld Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 10/896,527

(22) Filed: Jul. 22, 2004

(65) Prior Publication Data

US 2006/0019791 A1 Jan. 26, 2006

(51) Int. Cl.
F16H 3/62 (2006.01)
(52) U.S. Cl. .................................................. 475/276
(58) Field of Classification Search ............... 475/275, 475/276
See application file for complete search history.

(56) References Cited

U.S. PATENT DOCUMENTS

| | | | |
|---|---|---|---|
| 3,996,817 A | 12/1976 | Winzeler | |
| 4,531,428 A | 7/1985 | Windish | |
| 4,660,439 A | 4/1987 | Hiraiwa | |
| 4,823,641 A | 4/1989 | Kuhn et al. | |
| 4,914,978 A | 4/1990 | Moroto et al. | |
| 5,039,305 A | 8/1991 | Pierce | |
| 5,342,258 A | 8/1994 | Egyed | |
| 5,823,051 A | 10/1998 | Hall, III | |
| 5,967,935 A | 10/1999 | Park | |
| 6,176,803 B1 | 1/2001 | Meyer et al. | |
| 6,663,528 B1 | 12/2003 | Haka | |
| 6,736,751 B1 * | 5/2004 | Usoro et al. | 475/276 |
| 6,743,139 B1 * | 6/2004 | Usoro et al. | 475/275 |
| 6,743,140 B1 * | 6/2004 | Lee et al. | 475/275 |
| 6,743,142 B1 * | 6/2004 | Lee et al. | 475/276 |
| 6,743,143 B1 * | 6/2004 | Usoro et al. | 475/276 |
| 6,743,144 B1 * | 6/2004 | Lee et al. | 475/276 |
| 6,746,357 B1 * | 6/2004 | Usoro et al. | 475/275 |
| 6,752,736 B1 * | 6/2004 | Lee et al. | 475/275 |
| 6,755,765 B2 * | 6/2004 | Usoro et al. | 475/275 |
| 6,758,784 B2 * | 7/2004 | Lee et al. | 475/275 |
| 6,758,787 B2 * | 7/2004 | Usoro et al. | 475/296 |
| 6,764,424 B1 * | 7/2004 | Usoro et al. | 475/276 |
| 6,764,426 B2 * | 7/2004 | Usoro et al. | 475/296 |
| 6,767,307 B1 * | 7/2004 | Lee et al. | 475/276 |
| 6,811,512 B2 * | 11/2004 | Usoro et al. | 475/276 |
| 2003/0228951 A1 | 12/2003 | Haka | |
| 2004/0014553 A1 | 1/2004 | Ishimaru | |

\* cited by examiner

*Primary Examiner*—Dirk Wright
(74) *Attorney, Agent, or Firm*—David B. Kelley; MacMillan, Sobanski & Todd

(57) ABSTRACT

A multiple speed transmission includes first and second input clutches driveably connected to an input, and a gear system that includes four planetary gear units, each gear unit including a sun gear, a ring gear, planet pinions meshing with the sun gear and ring gear, and a carrier rotatably supporting the planet pinions. A first coupler releasably engages the first input clutch alternately with the sun gear of the first gear unit and the ring gear of the first gear unit. A second coupler releasably engages the sun gear of the fourth gear unit alternately with the sun gear of the second gear unit and the carrier of the fourth gear unit. A third coupler releasably engages a ground member alternately with the ring gear of the fourth gear unit and the ring gear of the third gear unit. A fourth coupler releasably engages a ground member alternately with the sun gear of the second gear unit and the carrier of the second gear unit. The first and second input clutches and the four couplers are engaged in multiple combinations to establish forward speed ratios and a reverse speed ratio between the input and output.

16 Claims, 5 Drawing Sheets

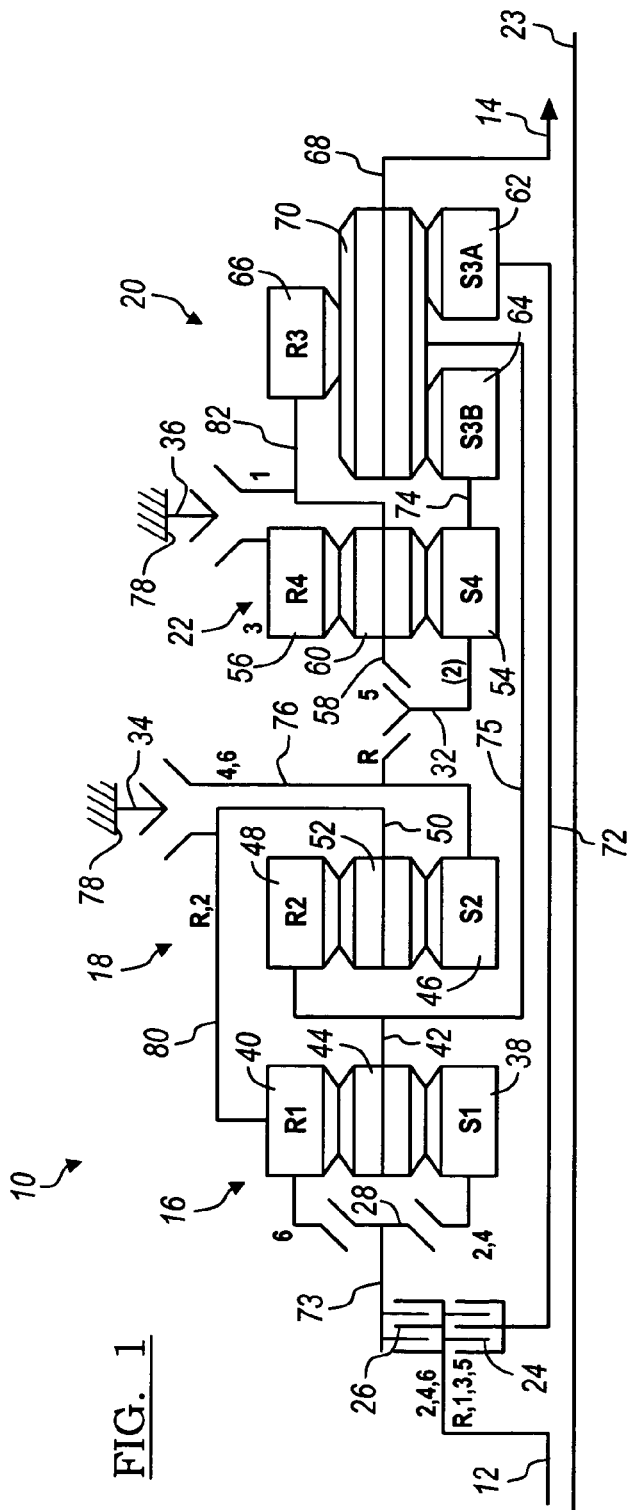

1ST GEAR POWER FLOW

2ND GEAR POWER FLOW

3RD GEAR POWER FLOW

4TH GEAR POWER FLOW

5TH GEAR POWER FLOW

6TH GEAR POWER FLOW

PLANETARY GEARING FOR A DUAL CLUTCH TRANSMISSION

BACKGROUND OF THE INVENTION

1. Field of the Invention

This invention relates to automatic transmissions having multiple input clutches, but no torque converter for driveably connecting an engine and the transmission. More particularly, the invention pertains to such transmissions in which the kinematic arrangement includes epicyclic or planetary gearing rather than layshaft gearing.

2. Description of the Prior Art

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open friction clutches and brakes, hydraulic pump, and gear meshes.

To improve fuel economy in a motor vehicle having an automatic transmission, an automated dual clutch transmission can be used to eliminate or substantially reduce all of these parasitic losses except gear mesh losses.

A dual clutch transmission consists essentially of two transmission units. One of the transmission units produces odd-numbered speed ratios; the other transmission unit produces even-numbered speed ratios. While operating in an odd numbered gear, synchronizers or couplers can be moved to configure the transmission for the next even numbered gear. A shift is then accomplished by releasing the clutch associated with the odd numbered gear while applying the clutch associated with the even numbered gear.

SUMMARY OF THE INVENTION

Most twin clutch transmissions use layshaft gearing, but a dual clutch transmission that uses planetary gearing is desirable because most of the automatic transmission manufacturing infrastructure is suited to planetary gearing.

Since planetary gear trains are arranged on a single axis, however, it is difficult to connect the transmission input to the rear gear units, and to connect the output of the front gear units to the output at the rear of the transmission. The transmission of this invention achieves this crossing of power paths by using two sun gears for one of the planetary gear units. The output of the front gear units, which produce even numbered gear ratios, is routed between these sun gears to the carrier and then to the output. The input to the rear gear units, which produce odd numbered gear ratios, crosses this power path by going through one sun-pinion mesh and then through a second pinion-sun mesh.

A dual clutch transmission according to this invention offers significant fuel economy improvement over a traditional automatic transmission because it eliminates most of the open clutch losses and all of the torque converter losses. In addition, planetary gearing produces lower gear mesh loss than does layshaft gearing.

Gear ratio changes are accomplished through the use of couplers, such as synchronizers or dog clutches, which mutually driveably connect components operative in each speed ratio. The couplers produce very little drag loss when disengaged, and do not require a continuous supply of power to stay engaged.

A multiple speed transmission according to this invention having these advantages includes first and second input clutches driveably connected to input. A gear system includes four planetary gear units, each gear unit including a sun gear, a ring gear, planet pinions meshing with the sun gear and ring gear, and a carrier rotatably supporting the planet pinions. A first coupler releasably engages the first input clutch alternately with the sun gear of the first gear unit and the ring gear of the first gear unit. A second coupler releasably engages the sun gear of the fourth gear unit alternately with the sun gear of the second gear unit and the carrier of the fourth gear unit. A third coupler releasably engages a ground member alternately with the ring gear of the fourth gear unit and the ring gear of the third gear unit. A fourth coupler releasably engages a ground member alternately with the sun gear of the second gear unit and the carrier of the second gear unit. The first and second input clutches and the four couplers are engaged in multiple combinations to establish forward speed ratios and a reverse speed ratio between the input and output.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a kinematic arrangement of a transmission according to this invention;

FIG. 2 is a chart showing an example of beta ratios for the gear units of the transmission of FIG. 1;

FIG. 3 is a chart showing the torque ratios produced by the transmission of FIG. 1 when using the beta ratios of FIG. 2;

DETAILED DESCRIPTION OF THE PREFERRED EMBODIMENT

Figure 4:
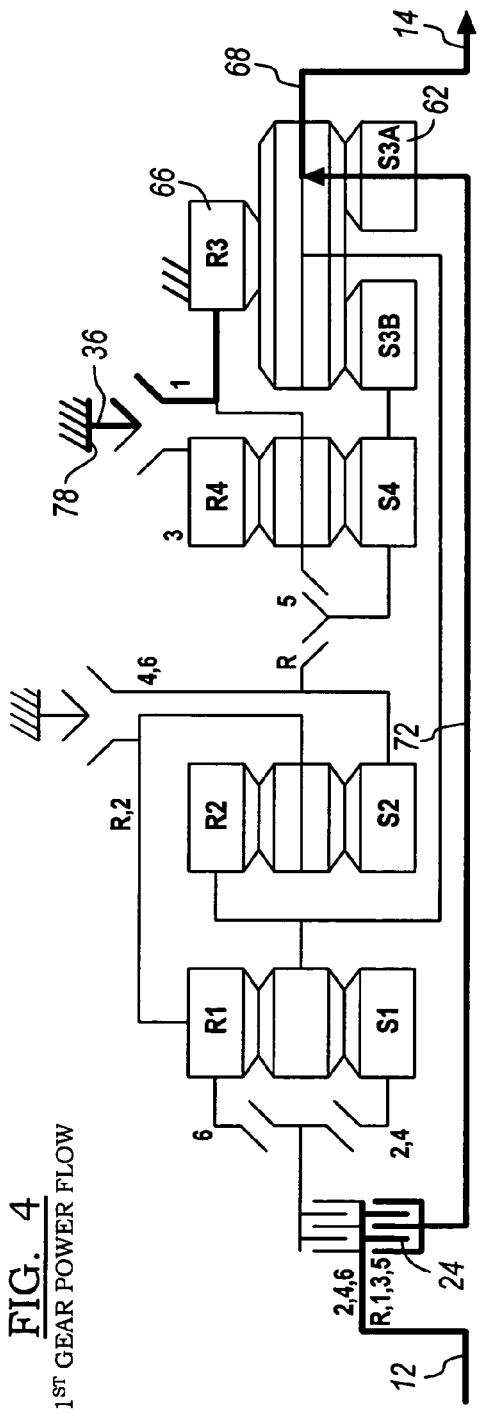
FIG. 4 shows the torque path through the transmission of FIG. 1 for first forward speed ratio.

Referring now to the drawings, there is illustrated in FIG. 1 the kinematic arrangement of transmission having an input 12 and an output 14. First, second, third and fourth planetary gear units 16, 18, 20, 22 are driveably connected between the input and output and arranged on a common longitudinal axis 23. The transmission 10 includes two selectively engageable friction clutches 24 and 26, secured to the input 12. Included also are four couplers 28, 32, 34 and 36, preferably synchronizer clutches, each coupler producing a releasable drive connection between a component on which the coupler is supported, and alternate components that are selectively engaged and released by the coupler. Each coupler may produce a drive connection by engaging one of the alternate components, and may produce no drive connection by fully disengaging all components.

The first planetary gear unit 16 includes a sun gear 38, ring gear 40, carrier 42, and planet pinions 44, which are rotatably supported on the carrier 42 in meshing engagement with the sun gear 38 and ring gear 40.

A second planetary gear unit 18 includes a sun gear 46, ring gear 48, carrier 50, and planet pinions 52, which are rotatably supported on the carrier 50 in meshing engagement with sun gear 46 and ring gear 48.

The fourth planetary gear unit 22 includes a sun gear 54, ring gear 56, carrier 58 and planet pinions 60, which are rotatably supported on carrier 58 in meshing engagement with the sun gear 54 and ring gear 56.

The third planetary gear unit 20 includes sun gears 62, 64, ring gear 66, carrier 68 connected to output 14, and relatively long planet pinions 70 rotatably supported on carrier 68 in meshing engagement with the sun gears 62, 64 and ring gear 66.

The output of the first input clutch 24 is driveably connected by an intermediate shaft 72 to sun gear 62. The output of the second input clutch 26 is secured by connecting member 73 to the coupler 28. Sun gears 54 and 64 are connected mutually by member 74. Carrier 68 is secured by member 75 to carrier 42, which is secured to ring gear 48.

Coupler 28 releasably engages alternately ring gear 40 and sun gear 38 to produce a drive connection to the second input clutch 26 through connecting member 73.

Coupler 32 releasably engages alternately sun gear 46 and carrier 58 to produce a drive connection to sun gear 54.

Sun gear 46 is secured to a disc 76, which is a releasably engaged by coupler 34 to ground the sun gear 46, i.e., to hold sun gear 46 against rotation on a grounding member 78, preferably the transmission housing. Ring gear 40 is driveably connected to carrier 50 by a drum 80, which is releasably engaged by coupler 34, to ground ring gear 40 and carrier 50 against rotation on the grounding member 78.

Coupler 36 releasably engages alternately ring gear 56 and ring gear 66, which is secured to carrier 58 by connecting member 82, thereby holding ring gear 56 and ring gear 66 alternately against rotation on the grounding member 78.

A torque path for bypassing the third gear unit 20 and driveably connecting the input 12 to the fourth gear unit 22 is employed in reverse speed, third forward speed and fifth forward speed. When input 12 is connected to sun gear 62 in those speeds, the bypass torque path transmits torque from input 12, input clutch 24, sun gear 62, planet pinions 70, sun gear 64, and connecting member 74, to sun gear 54.

In operation, the first forward speed ratio is produced by engaging input clutch 24 and engaging coupler 36 with ring gear 66, thereby grounding ring gear 66 on the transmission housing 78. Referring to FIG. 4, with the control elements disposed in this way, input 12 is driveably connected to sun gear 62 through shaft 72 and input clutch 24. A torque reaction is produced at ring gear 66, and the carrier 68 and output 14 are underdriven in relation to the speed of the input 12.

The beta ratios, the ratio of the pitch diameter of the ring gear to the pitch diameter of the corresponding sun gear, of the gear units are shown in FIG. 2. The corresponding torque ratio for each of the speed ratios and the steps between the speed ratios are set forth in FIG. 3. For example, when the beta ratios of FIG. 2 apply to the transmission 10, the torque ratio for the first forward speed ratio is 4.200. While the transmission is operating in the first forward speed, the transmission is prepared for a shift to the second forward speed ratio by using coupler 34 to engage drum 80, and using coupler 28 to engage sun gear 38.

Figure 5:
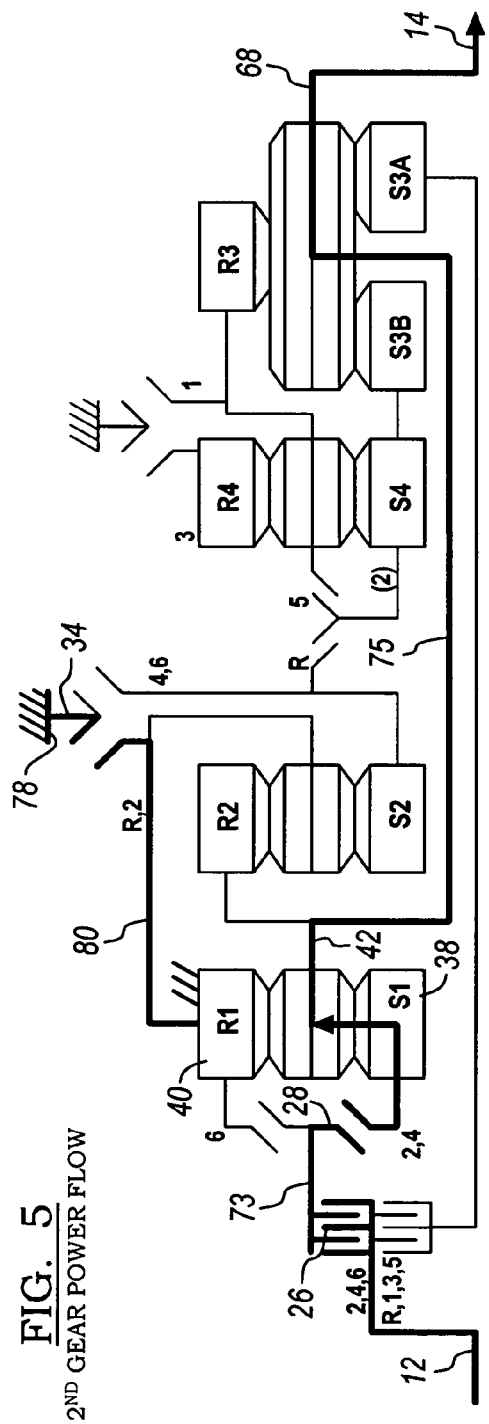
FIG. 5 shows the torque path for the second forward speed ratio.

An upshift from the first speed to the second speed occurs by disengaging input clutch 24, engaging input clutch 26, and disengaging coupler 36. Referring now to FIG. 5, ring gear 40 provides a torque reaction because it is held against rotation on the grounding member 78. Input 12 drives sun gear 38 and carrier 42 is underdriven in relation to the speed of input 12. Member 75 drives carrier 68 and output 14 at the speed of carrier 42 at a torque ratio of 2.800 using the beta ratios of FIG. 2.

Figure 6:
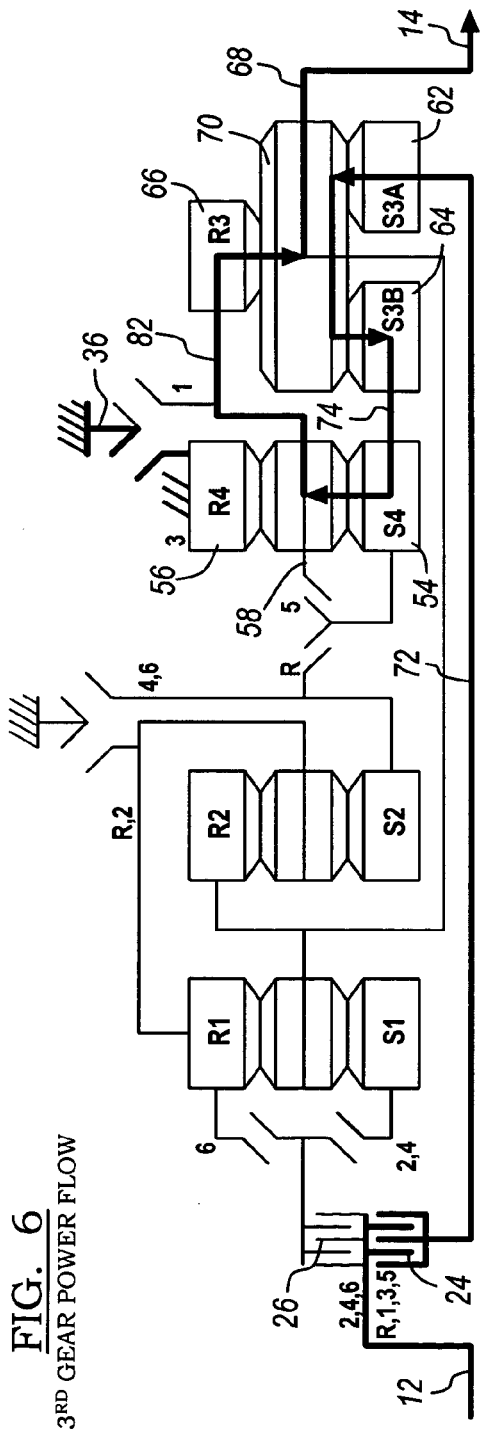
FIG. 6 shows the torque path for the third forward speed ratio.

While operating in the second forward speed ratio, the transmission can be prepared for an upshift to the third speed by engaging coupler 36 with ring gear 56. An upshift to the third speed from the second speed occurs by disengaging input clutch 26, engaging input clutch 24, and disengaging coupler 34. Referring to FIG. 6, input 12 drives sun gear 62 through intermediate shaft 72, and the input is connected through the bypass torque path to sun gear 54. Ring gear 56 is grounded providing a torque reaction, and carrier 58 underdrives ring gear 66. The output is taken at carrier 68 and output 14 at a torque ratios of 1.960 using the beta ratio of FIG. 2.

Figure 7:
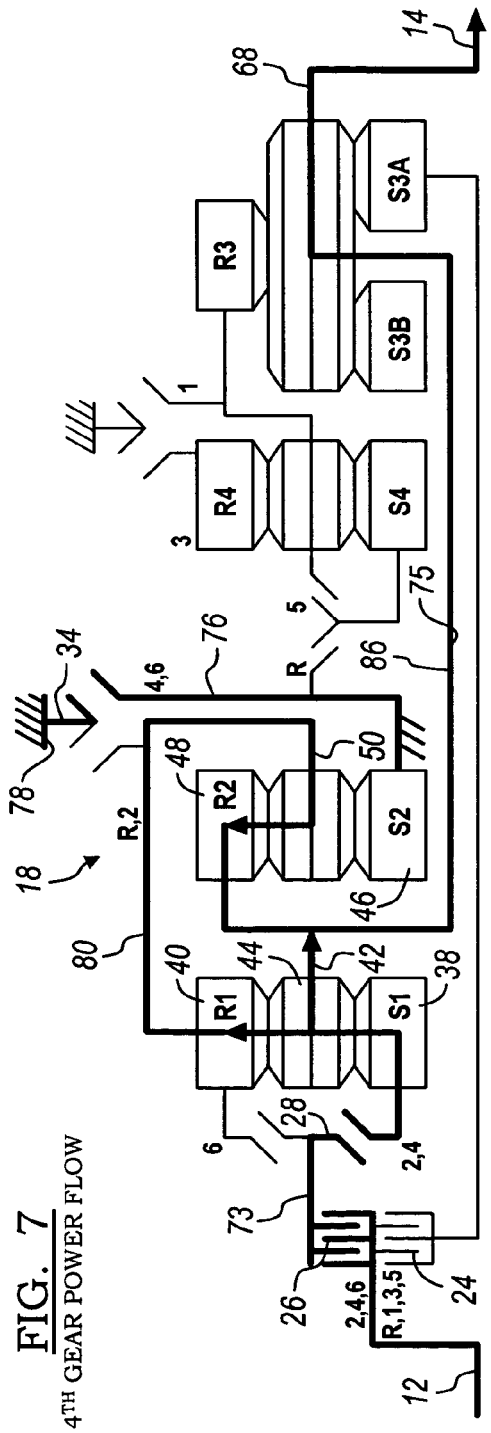
FIG. 7 shows the torque path for the fourth forward speed ratio.

While operating in the third speed ratio, the transmission can be prepared for an upshift to the fourth speed by engaging coupler 34 with sun gear 46 though disc 76, and using coupler 28 to engage sun gear 38. An upshift to the fourth speed from the third speed occurs by disengaging input clutch 24, engaging input clutch 26, and disengaging coupler 36. Referring to FIG. 7, input 12 is driveably connected to sun gear 36 through clutch 26 and coupler 28. A torque reaction is provided at sun gear 46, and the ring gear, which is underdriven, drives output 14 through member 75 and carrier 68 at a torque ratio of 1.400 using the beta ratios of FIG. 2.

Figure 8:
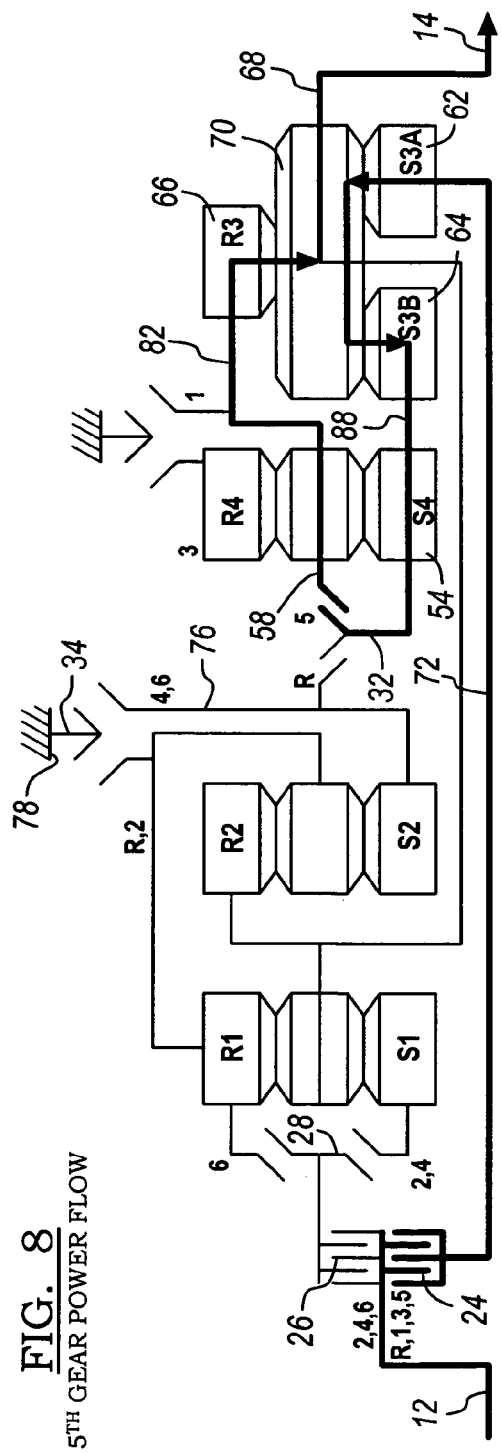
FIG. 8 shows the torque path for the fifth forward speed ratio.

While operating in the fourth speed ratio, the transmission can be prepared for an upshift to the fifth speed by engaging coupler 32 with carrier 58. An upshift to the fifth speed from the fourth speed occurs by disengaging input clutch 26, engaging input clutch 24, and disengaging coupler 28. Referring to FIG. 8, input 12 is driveably connected to sun gear 62 through clutch 24 and intermediate shaft 72. The bypass torque path driveably connects sun gears 62 and 54, which is connected to carrier 58 and ring gear 66 through coupler 32. Sun gears 66 and 64, and ring gear 66 rotate at the same speed and direction. Therefore, the third gear unit 20 is locked-up and drives output 14 at that speed, a direct drive ratio.

Figure 9:
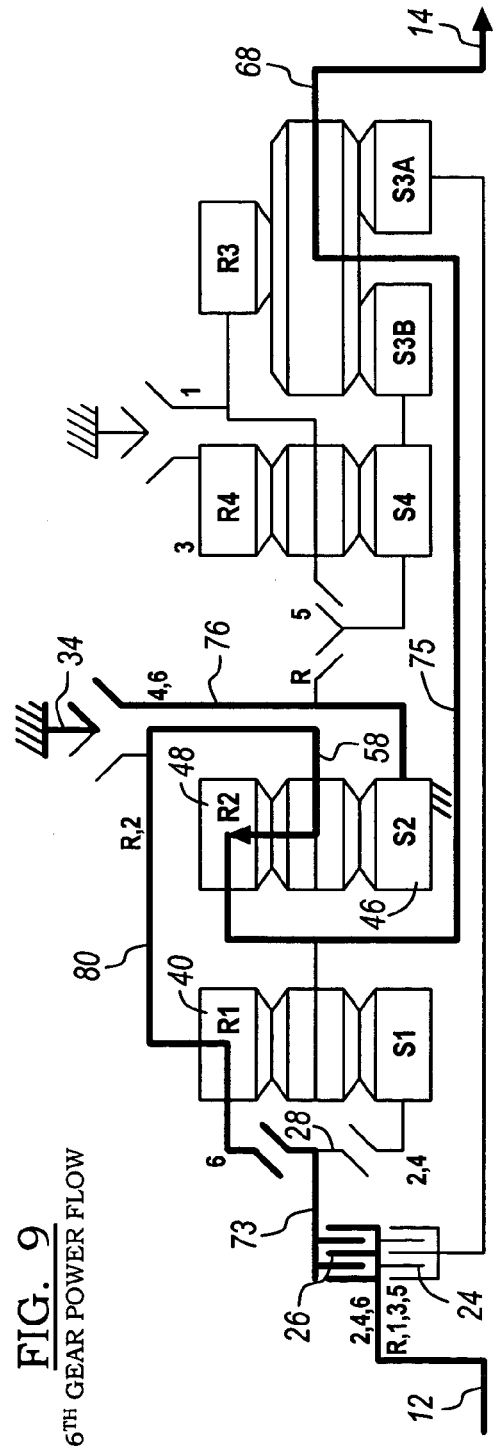
FIG. 9 shows the torque path for the sixth forward speed ratio.

While operating in the fifth speed, the transmission can be prepared for an upshift to the sixth speed by engaging coupler 34 with sun gear 46 through disc 76, and engaging coupler 28 with ring gear 40. An upshift to the sixth speed from the fifth speed occurs by disengaging input clutch 24 and engaging input clutch 26. Referring now to FIG. 9, input 12 is driveably connected to carrier 46 through clutch 26, coupler 28, ring gear 40, and drum 80. A torque reaction is provided at sun gear 46, and ring gear 48 and output 14 are over driven due to their mutual connection through carrier 68 and connecting member 75 at a torque ratio of 0.776 using the beta ratios of FIG. 2.

Figure 10:
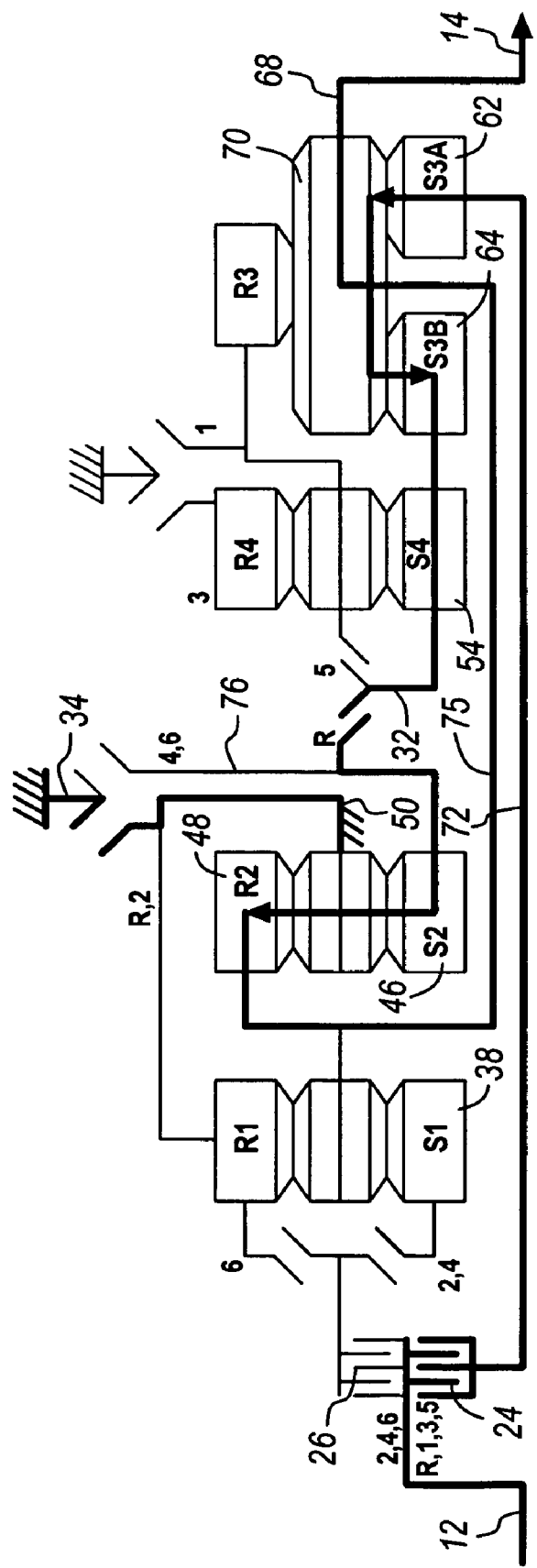
FIG. 10 shows the torque path for the reverse speed ratio.

Reverse drive is produced by engaging input clutch 24 and disengaging input clutch 26, engaging coupler 34 to ground carrier 50, and engaging coupler 32 to connect sun gears 54, 64 with sun gear 46. Referring to FIG. 10, input 12 is driveably connected through input clutch 24 and intermediate shaft 72 to sun gear 62. The bypass torque path driveably connects sun gear 62 to sun gear 46 through coupling 32. A torque reaction is provided at carrier 50 through coupler 34. The output of the second gear unit 18, ring gear 48, is underdriven in the reverse direction. Connecting member 75 drives carrier and output 14 at the speed of ring gear 48 in the reverse direction with a torque ratio of −3.500, when using the beta ratios of FIG. 2.

The even-numbered speed ratios and reverse drive are produced in gearsets 16 and 18. The odd-numbered speed ratios are produced in gearsets 20 and 22. When the transmission produces the third and fifth forward speed ratios and reverse drive, the input torque, transmitted through input clutch 24 to sun gear 62, bypasses carrier 68 and output 14, and is transmitted instead from sun gear 62 through planet pinions 70 and sun gear 64 to sun gear 54.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple speed transmission comprising:
   an input;
   an output;
   a first input clutch driveably connected to the input;
   a second input clutch driveably connected to the input;
   a gear system comprising first, second, third and fourth planetary gear units, each gear unit including a sun gear, a ring gear, planet pinions meshing with the sun gear and ring gear, and a carrier rotatably supporting the planet pinions, the third gear unit including a second sun gear meshing with the planet pinions of the third gear unit;
   the carrier of the first gear unit, ring gear of the second gear unit and carrier of the third gear unit being mutually driveably connected and secured to the output;
   the ring gear of the first gear unit and carrier of the second gear unit being mutually driveably connected;
   the carrier of the fourth gear unit and ring gear of the third gear unit being mutually driveably connected;
   the second sun gear of the third gear unit and the sun gear of the fourth gear unit being mutually driveably connected;
   a first coupler releasably engagable between the second input clutch and alternately the sun gear of the first gear unit, and the ring gear of the first gear unit;
   a second coupler releasably engagable between the sun gear of the fourth gear unit and alternately the sun gear of the second gear unit, and the mutually connected carrier of the fourth gear unit and ring gear of the third gear unit;
   a third coupler releasably engagable between a ground member and alternately the ring gear of the fourth gear unit, and the mutually connected ring gear of the third gear unit and carrier of the fourth gear unit; and
   a fourth coupler releasably engagable between a ground member and alternately the sun gear of the second gear unit, and the mutually connected carrier of the second gear unit and ring gear of the first gear unit.

2. The transmission of claim 1 wherein a bypass torque path for bypassing the third gear unit and driveably connecting the input to the fourth gear unit includes:
   the first input clutch;
   the first sun gear of the third gear unit;
   the planet pinions of the third gear unit;
   the second sun gear of the third gear unit; and
   the sun gear of the fourth gear unit.

3. The transmission of claim 1 wherein a first group of alternate forward speed ratios and reverse drive are produced in the first and second gearsets.

4. The transmission of claim 1 wherein a second group of alternate forward speed ratios are produced in the third and fourth gearsets.

5. The transmission of claim 1 wherein the second input clutch is engaged for operation in a first group of alternate forward speed ratios and reverse drive.

6. The transmission of claim 1 wherein the first input clutch is engaged for operation in a second group of alternate forward speed ratios.

7. The transmission of claim 1 wherein:
   the sun gear and second sun gear of the third gear set are spaced mutually along a longitudinal axis in meshing engagement with the planet pinions of the third gear unit; and
   further comprising:
   an intermediate shaft extending along the axis, driveably connected to the sun gear of the third gear unit and an output of the first input clutch; and
   a connecting member extending along the longitudinal axis, driveably connected to the ring gear of the second gear unit and carrier of the first gear unit and driveably connected to the carrier of the third gear unit in an axial space between the sun gear and second sun gear of the third gear set.

8. A multiple speed transmission comprising:
   an input;
   an output;
   a first input clutch driveably connected to the input;
   a second input clutch driveably connected to the input;
   a gear system comprising first, second, third and fourth planetary gear units, each gear unit including a sun gear, a ring gear, planet pinions meshing with the sun gear and ring gear, and a carrier rotatably supporting the planet pinions;
   a first coupler releasably engagable between the second input clutch and alternately the sun gear of the first gear unit, and the ring gear of the first gear unit;
   a second coupler releasably engagable between the sun gear of the fourth gear unit and alternately the sun gear of the second gear unit, and the mutually connected carrier of the fourth gear unit and ring gear of the third gear unit;
   a third coupler releasably engagable between a ground member and alternately the ring gear of the fourth gear unit, and the mutually connected ring gear of the third gear unit and carrier of the fourth gear unit;
   a fourth coupler releasably engagable between a ground member and alternately the sun gear of the second gear unit, and the mutually connected carrier of the second gear unit and ring gear of the first gear unit; and
   the first and second input clutches and the four couplers being engaged in multiple combinations to establish multiple forward speed ratios and one reverse speed ratio between the input and output.

9. The transmission of claim 8 wherein:
   first, third and fifth forward speed ratios are produced in the third and fourth gear units.

10. The transmission of claim 8 wherein:
    second, fourth and sixth forward speed ratios are produced in the first and second gear units.

11. The transmission of claim 8 wherein:
    second, fourth and sixth forward speed ratios and a reverse speed ratio are produced in the first and second gear units.

12. A planetary transmission producing multiple speeds between an input and an output, comprising:

a gear system that includes first, second, third and fourth planetary gear units arranged along an axis, each gear unit including a sun gear, a ring gear, planet pinions meshing with the sun gear and ring gear, and a carrier rotatably supporting the planet pinions, the first and second gear units producing a first group of alternate speeds, the third and fourth gear units producing a second group of alternate speeds, the first and second gear units being located axially between the input and the third and fourth gear units, the third and fourth gear units being located axially behind the first and second gear units and ahead of the output, the carrier of the third gear unit being driveably connected to the output;

a connecting member driveably connected to the first and second gear units, to the carrier of the third gear unit, and to the output;

a first input clutch selectively driveably connecting and releasing the input and a component of at least one of the third and fourth gear units;

a second input clutch selectively driveably connecting and releasing the input and a component of at least one of the first and second gear units; and an intermediate shaft driveably connected to an output of the first input clutch and the sun gear of the third gear unit.

13. The transmission of claim 12, further comprising an intermediate shaft driveably connected to an output of the first input clutch and the sun gear of the third gear unit, and wherein;

the third gear unit includes a second sun gear spaced axially from the sun gear of the third gear unit;

the first and second gear units are located axially between the input and the third and fourth gear units;

the third and fourth gear units are located axially behind the first and second gear units and ahead of the output;

the carrier of the third gear unit is driveably connected to the output; and the connecting member is driveably connected to the carrier of the third gear unit axially between the sun gear of the third gear unit and the second sun gear of the third gear unit.

14. The transmission of claim 12, wherein:

the third gear unit further includes a second sun gear meshing with the planet pinions of the third gear unit;

the carrier of the first gear unit, ring gear of the second gear unit and carrier of the third gear unit are mutually driveably connected and secured to the output;

the ring gear of the first gear unit and carrier of the second gear unit are mutually driveably connected;

the carrier of the fourth gear unit and ring gear of the third gear unit are mutually driveably connected; and the second sun gear of the third gear unit and sun gear of the fourth gear unit are mutually driveably connected.

15. The transmission of claim 12, further comprising:

a first coupler releasably engagable between the second input clutch and alternately the sun gear of the first gear unit, and the ring gear of the first gear unit;

a second coupler releasably engagable between the sun gear of the fourth gear unit and alternately the sun gear of the second gear unit, and the mutually connected carrier of the fourth gear unit and ring gear of the third gear unit;

a third coupler releasably engagable between a ground member and alternately the ring gear of the fourth gear unit, and the mutually connected ring gear of the third gear unit and carrier of the fourth gear unit; and a fourth coupler releasably engagable between a ground member and alternately the sun gear of the second gear unit, and the mutually connected carrier of the second gear unit and ring gear of the first gear unit.

16. The transmission of claim 12, further comprising:

the third gear unit further includes a second sun gear meshing with the planet pinions of the third gear unit;

the carrier of the first gear unit, ring gear of the second gear unit and carrier of the third gear unit are mutually driveably connected and secured to the output;

the ring gear of the first gear unit and carrier of the second gear unit are mutually driveably connected;

the carrier of the fourth gear unit and ring gear of the third gear unit are mutually driveably connected;

the second sun gear of the third gear unit and sun gear of the fourth gear unit are mutually driveably connected;

a first coupler releasably engagable between the second input clutch and alternately the sun gear of the first gear unit, and the ring gear of the first gear unit;

a second coupler releasably engagable between the sun gear of the fourth gear unit and alternately the sun gear of the second gear unit, and the mutually connected carrier of the fourth gear unit and ring gear of the third gear unit;

a third coupler releasably engagable between a ground member and alternately the ring gear of the fourth gear unit, and the mutually connected ring gear of the third gear unit and carrier of the fourth gear unit; and a fourth coupler releasably engagable between a ground member and alternately the sun gear of the second gear unit, and the mutually connected carrier of the second gear unit and ring gear of the first gear unit.

* * * * *